United States Patent Office 3,661,862
Patented May 9, 1972

3,661,862
PROCESS FOR THE PREPARATION OF
POLYURETHANE MASTICS
Yves Bonin and Jean Robin, Lyon, France, assignors to
Rhone-Poulenc S.A., Paris, France
No Drawing. Filed Mar. 11, 1969, Ser. No. 806,310
Claims priority, application France, Mar. 12, 1968,
143,386
Int. Cl. C08g 22/04
U.S. Cl. 260—77.5 AP                    11 Claims

ABSTRACT OF THE DISCLOSURE

The invention provides a two-stage process for the preparation of a polyurethane mastic which comprises first reacting a macrodiol with a polyisocyanate in an amount such that there are 1 to 2 isocyanate groups per hydroxyl group to produce an isocyanate terminated prepolymer and then adding more polyisocyanate.

The present invention relates to the preparation of polyurethane mastics which are stable when stored in the absence of water and which are cured by moisture. More particularly the invention relates to the preparation of polyurethane mastics of the abovementioned type which after curing have a low modulus (force required for a given elongation) and a high elongation at break.

Polyurethane mastics having as their essential constituent a prepolymer containing terminal isocyanate groups are known and have been prepared by reacting a macrodiol with an excess of a polyisocyanate. These mastics, which are cured by exposure to atmospheric moisture, can also contain fillers, pigments and various adjuvants.

Mastics or filling compositions are becoming progressively more important especially in the building industry where modern construction techniques require the use of a large amount of jointing products. The joints obtained after the curing of mastics must satisfy various criteria imposed by the conditions under which they are used. Thus they must be able to be deformed when stretched without loss of adhesion or breakage and therefore must have a good strength of adhesion to the materials to be jointed, a good cohesion, a high elongation at break and a low modulus. In this respect single-component polyurethane mastics have aroused a certain interest especially because of the ease with which they can be employed. However, in many cases they possess too high a modulus after curing to be usable under optimum conditions.

French patent specification No. 1,237,936 propose a process for obtaining polyurethane mastics of low modulus which comprises reacting a polymeric polyol with an excess of a diisocyanate to yield a macropolyisocyanate into which a small quantity of a monofunctional modifier such as a monoalcohol, a monoamine or a monoisocyanate is incorporated. The so obtained mastics when cured by exposure to atmospheric moisture do have a low modulus but their cohesion, as revealed by their tensile strength, is low. Their elongation at break may prove to be insufficient for certain uses.

The present invention provides a process for preparing single-component polyurethane mastics which are stable when stored in the absence of water, are cured by moisture (such as atmospheric moisture) and which after curing have a low modulus. Apart from their low modulus the cured products also have good cohesion and a high elongation at break.

The process according to the invention comprises first reacting a macrodiol with a polyisocyanate in an amount such that there are 1 to 2, preferably 1.1 to 1.5, isocyanate groups per hydroxyl group to produce an isocyanate-terminated prepolymer and then adding more polyisocyanate. The addition of polyisocyanate is preferably at least enough to provide a further 0.1 isocyanate group per hydroxyl group of the macrodiol. The total amount of polyisocyanate used is not critical but it is preferable to use such amounts of the reagents that there are 1.1 to 3 isocyanate groups per one hydroxyl group.

The addition of polyisocyanate in two stages causes a completely unexpected lowering in the modulus and increase in the elongation at break of the cured mastics without at the same time reducing their tensile strength.

The macrodiols used are preferably linear polymers with a molecular weight of 500 to 5000, preferably 1000 to 3000.

Polyoxyalkylene glycols are particularly preferred macrodiols because they generally give the cured mastics of the lowest moduli. For example the polyoxyalkylene glycols obtained by polymerisation, in the presence of an acid or basic catalyst and of water or a dialcohol of one or more alkylene oxides such as ethylene, propylene, styrene, trimethylene, tetramethylene, hexamethylene or decamethylene oxides may be used.

Dihydroxypolyesters with an acid number of less than 10 preferably less than 5 may also be used. These polyesters are usually obtained by reaction of one or more carboxylic diacid with a suitable quantity of one or more dialcohols. The diacids usually used include succinic, adipic, azelaic, sebacic, 1,4-cyclohexanedicarboxylic and ortho-, meta or terephthalic acids. The dialcohols used include 1,2-ethanediol, 1,2- and 1,3-propanediol, 1,6-hexanediol, 2,2-dimethyl-1,3-propanediol and diethylene glycol. Another method for preparing these macrodiol polyesters comprises polycondensating lactones with dialcohols.

The polyisocyanates used in the present invention may be aliphatic, cycloaliphatic or aromatic, aromatic polyisocyanates being preferred. The following polyisocyanates can for example, be used:

2,4 and 2,6-diisocyanato-toluene,
bis(4-isocyanatophenyl)methane,
bis(4-isocyanato-3-methyl-phenyl)methane,
bis(4-isocyanato-phenyl)ether,
4,4'-diisocyanato-biphenyl,
1,5-diisocyanato-naphthalene,
1,3-bis(isocyanatomethyl)benzene,
bis(4-isocyanato-cyclohexyl)methane,
1,3-diisocyanatocyclohexane,
1,6-diisocyanato-hexane and the polyisocyanates obtained by phosgenation of aniline-aldehyde polycondensates, in particular those obtained by the phosgenation of aniline-formaldehyde polycondensates.

The preparation of the isocyanate-terminated prepolymer is carried out under an inert gas atmosphere and the macrodiol used is preferably previously dehydrated. The macrodial may be dehydrated by azeotropic distillation using a solvent such as benzene or toluene. The macrodiol is then reacted at a temperature of 40° C. to 150° C., preferably 60° C. to 100° C., with a polyisocyanate in an amount such that there are 1 to 2 isocyanate groups per hydroxyl group and for sufficient time for at least 95% of the hydroxyl groups to react. This reaction can also be carried out in the presence of catalysts for the formation of urethane groups. This catalyst addition reduces the reaction time and reaction temperature. The catalysts used include the metallic derivatives enumerated by Saunders and Frisch in the work "Polyurethanes, Chemistry and Technology," volume 1, pages 167, 168 and 169, and in particular the tin derivatives such as dibutyl-tin dilaurate or tetrabutyl-tin or tertiary amines such as triethylamine, triethylenediamine, N-methylmorpholine or also N,N'-dimethylpiperazine.

The prepolymer thus prepared is then mixed with more polyisocyanate, throughout under an inert gas atmosphere.

The polyisocyanate used in the formation of the prepolymer is not necessarily the same as that added after the reaction. It is preferable to add a polyisocyanate of low vapour pressure to the finished prepolymer so as to avoid the user coming to physiological harm. In fact, since this polyisocyanate is in the free state in the compositions, its inhalation may in the long run cause respiratory trouble. The polyisocyanates used in the preparation of the prepolymers are preferably difunctional compounds because polyisocyanates of a functionality greater than 2 may cause gel formation.

As has been stated before, the addition of polyisocyanates in two stages causes a lowering in the modulus and an increase in the elongation at break of the cured mastics. It is thus possible to affect these properties by varying the ratio of the amount of polyisocyanate added in the first stage to the amount of polyisocyanate added in the second stage. It is however obvious that for a given macrodiol and a given polyisocyanate the variations in these properties is limited to a particular range by the intrinsic nature of the starting materials and that in order to go outside this range it is necessary to use a different macrodiol and/or polyisocyanate.

Fillers, pigments, plasticisers, diluents, catalysts for the reaction of the isocyanate groups with water and various adjuvants, whose use is well known to the specialist can be added to the mastics obtained by the process according to the invention.

Preferred pigments and fillers include silicas produced by combustion, or ground crude silicas, ground quartz, alumina, oxides of titanium, zinc, iron or calcium, micas, calcium carbonate, graphite, carbon black, cork powder, organic dyestuffs or certain polymers such as polyvinyl chloride.

As plasticisers it is possible to use alkyl phthalates, adipates, sebacates or phosphates, or polyurethanes of low molecular weight which are free of groups containing active hydrogen.

The preferred diluents are halogenated or non-halogenated aromatic hydrocarbons and aliphatic or cycloaliphatic halogenated hydrocarbons.

The catalysts for the reaction of the isocyanate groups with the water used to accelerate the setting of the mastics are the same as those described above for use in the formation of the urethane groups.

The adjuvants used may include anti-oxidants such as mixtures of polyphenols or phenolic derivatives substituted by tertiary butyl radicals of the type of 1,5-ditertiary butyl-paracresol or 1,1-bis(3-tertiary butyl-4-hydroxy-6-methyl-phenyl)-butene-1, and ultra-violet protection agents such as for example 2-hydroxy-4-dodecyloxybenzophenone or 2,2' - dihydroxy - 4 - octyloxy-benzophenone.

The additives mentioned above are generally added to the finished prepolymer but they can also be incorporated before or during its preparation.

The mastics obtained by the process of the invention can be applied by the usual methods, have a wide application and are especially useful for joining, covering, glueing or coating various substrates such as cement, timber, glass or metals. Their curing in air, caused by atmospheric moisture, generally takes 2 to 10 days at ordinary temperatures. This time interval of course depends on the amount of catalyst, if any used and on the moisture content of the ambient atmosphere. When mastics are stored in the absence of moisture they keep without variation in their composition or change in their properties.

In the examples given below the mechanical properties are measured in accordance with French standard specification AFNOR T 46,002.

EXAMPLE 1

500 g. of toluene and 1800 g. of polyoxypropylene glycol of molecular weight 1800 and hydroxyl number 62.2 are introduced into a cylindrical borosilicate glass reactor of 2 l. capacity which is fitted with a stainless steel stirred. To dehydrate the mixture the toluene is distilled at atmospheric pressure until the temperature of the reaction mixture reaches 120° C. and the pressure is then gradually reduced to 2 mm. of mercury. The mixture is kept at 120° C. under 2 mm. of mercury for about 45 minutes so that all the toluene is removed. The pressure is returned to atmosphere pressure under an atmosphere of dry nitrogen, the reaction mixture is cooled to 50° C. and 1 g. of dibutyl-tin dilaurate and 209 g. of a mixture containing 80% of 2,4-diisocyanato-toluene and 20% of the 2,6-isomer are then added with stirring. The mixture is heated to 80° C., kept at this temperature for 40 minutes and then cooled to room temperature (20° C.). The prepolymer obtained contains 0.84% by weight of NCO groups.

79.5 g. of PAPI (trade name of a polyarylpolyisocyanate containing 0.75 NCO groups per 100 g., obtained by phosgenation of the condensation product of aniline and formaldehyde and manufactured by the Upjohn Company) are mixed with this prepolymer, the process being carried out under a nitrogen atmosphere. The viscosity of the resulting mastic is 2500 poises at 25° C.

This mastic when spread as a 2.5 mm. thick layer hardens within 3 days on exposure to atmospheric moisture (relative humidity 30–60%), the temperature being 20–25° C. After 7 days the cured product has the following mechanical properties:

Tensile strength—24 kg./cm.$^2$
Elongation at break—930%
Modulus at 100% elongation—2.4 kg./cm.$^2$ If instead of mixing the PAPI with the prepolymer the PAPI is introduced at the same time as the diisocyanato-toluene, that is to say according to the usual process, a mastic having the following mechanical properties is obtained:

Tensile strength—17 kg./cm.$^2$
Elongation at break—35%
Modulus at 100% elongation—8 kg./cm.$^2$

EXAMPLE 2

200 g. of toluene and 404 g. of polyoxypropylene glycol of molecular weight 2020 and hydroxyl number 54.9 are introduced into a borosilicate glass cylindrical reactor of 1 l. capacity fitted with a stainless steel stirrer. The mixture is dehydrated as in the preceding example and 0.045 g. of dibutyl-tin dilaurate and 41.8 g. of a mixture of 80% of 2,4-diisocyanato-toluene and 20% of 2,6-isomer are then added to the reaction mixture coled to 60° C. The mixture is heated to 80° C. for 1 hour 15 minutes, throughout under a nitrogen atmosphere, and is then cooled to room temperature. The resulting prepolymer, which contains 0.64% by weight of NCO groups is divided into 4 portions A, B, C and D, each of 100 g. The portions A and B are mixed with 3.6 g. and 9.6 g. respectively of PAPI and the portions C and D with 3.9 g. and 10.3 g. repectively of crude bis(4-isocyanatophenyl)methane containing 29.3% by weight of NCO groups.

The mastic produced from each portion is spread as a 2.5 mm. thick layer and after 7 days exposure to atmospheric moisture under the conditions of Example 1, the cured products possess the following mechanical properties:

| Portion | Viscosity at 25° C. in poises | Setting time, days | Tensile strength in kg./cm.² | Elongation at break in percent | Modulus at 100% elongation in kg./cm.² |
|---|---|---|---|---|---|
| A | 7,500 | 3½ | 25 | 1,000 | 2 |
| B | 6,500 | 6 | 25 | 600 | 3 |
| C | 8,800 | 3½ | 20 | 1,230 | 1.3 |
| D | 7,400 | 6 | 19.5 | 840 | 3.4 |

EXAMPLE 3

Following the procedure described in Example 1, a prepolymer is prepared and 26.5 g. of PAPI are added to it. 4 portions E, F, G and H, each of 100 g. are removed. To portion E is added 10 g. of carbon black, to portion F 10 g. of titanium oxide plus 10 g. of polyvinyl chloride, to portion G and 20 g. of polyvinyl chloride, while portion H remains unmodified. The mastic produced from each portion is spread in a 2.5 mm. thick layer and after 2 days exposure to atmospheric moisture (relative humidity 30–60%, temperature 20–25° C.) in the case of portions E, F and G and 4 days in the case of portion H, the cured products have the following mechanical properties.

| Portion | Viscosity at 25° C. in poises | Tensile strength in kg./cm.² | Elongation at break in percent | Modulus at 100% elongation in kg./cm.² |
|---|---|---|---|---|
| E | | 34 | 1,150 | 3.3 |
| F | 7,500 | 30 | 1,100 | 3.5 |
| G | 7,000 | 25 | 1,050 | 3.6 |
| H | 3,000 | 30 | 1,250 | 3 |

EXAMPLE 4

200 g. of toluene and 405 g. of a poly(propylene glycol adipate) of molecular weight 1930, hydroxyl number of 58 and acid number 1 are introduced into a borosilicate glass cylindrical reactor of 1 l. capacity provided with a stainless steel stirrer.

159 g. of toluene are distilled off, the mixture is cooled to 40° C. and 0.224 g. of dibutyl-tin dilaurate, 32 g. of anhydrous toluene and 43.8 g. of a mixture containing 80% of 2,4-diisocyanateotoluene and 20% of 2,6-isomer are added. The mixture is maintained at 80° C. for 2 hours 30 minutes and then cooled to room temperature, to yield a prepolymer containing 0.63% by weight of NCO groups.

6.5 g. of bis(4-isocyanato-phenyl)methane are mixed with 225 g. of this prepolymer. The resulting mastic, having a viscosity of 3,000 poises at 25° C., is spread in a 2.5 mm. thick layer. Its curing by atmospheric moisture (relative humidity 30–60%, temperature 20–25° C.) requires 7 days, and after 14 days the cured product has the following mechanical properties:

Tensile strenght—25 kg./cm.²
Elongation at break—1330%
Modulus at 100% elongation—5.6 kg./cm.²

We claim:
1. A polyurethane mastic prepared by first reacting a macrodiol with an aliphatic, cycloaliphatic or wholly carbocyclic aromatic polyisocyanate in an amount such that there are 1 to 2 isocyanate groups per hydroxyl group to produce an isocyanate terminated prepolymer and then adding more of the said polyisocyanate to provide at least a further 0.1 isocyanate group per hydroxyl group of the macrodiol.

2. A mastic according to claim 1 wherein in the first stage the macrodiol and the polyisocyanate are reacted in an amount such that there are 1.1 to 1.5 isocyanate groups per hydroxyl group.

3. A mastic according to claim 1 wherein the total amount of reagents used is such that there are 1.1–3 isocyanate groups per hydroxyl group in the original macrodiol.

4. A mastic according to claim 1 wherein the macrodiol used has a molecular weight of between 500–5000.

5. A mastic according to claim 1 wherein the macrodiol used has a molecular weight of 1000–3000.

6. A mastic according to claim 1 wherein the macrodiol is a polyoxyalkylene glycol.

7. A mastic according to claim 1 wherein the macrodiol is a polyester of acid number less than 10.

8. A mastic according to claim 1 wherein the polyisocyanate used in the first stage is different from that added in the second stage.

9. A mastic according to claim 1 wherein the polyisocyanate is a diisocyanate.

10. A mastic according to claim 1 wherein the polyisocyanate is aromatic.

11. A mastic according to claim 1 wherein the polyisocyanate is selected from the class consisting of 2,4- and 2,6-diisocyanato-toluene,
bis(4-isocyanatophenyl)methane,
bis(4-isocyanato-3-methyl-phenyl)methane,
bis(4-isocyanato-phenyl)ether,
4,4'-diisocyanato-biphenyl,
1,5-diisocyanatonaphthalene,
1,3-bis(isocyanatomethyl)benzene,
bis(4-isocyanato-cyclohexyl)methane,
1,3-diisocyanatocyclohexane,
1,6-diisocyanatohexane, and a polyisocyanate obtained by phosgenation of an aniline-formaldehyde polycondensate.

References Cited

UNITED STATES PATENTS

| 2,929,800 | 3/1960 | Hill | 260—77.5 |
| 3,454,533 | 7/1969 | Kerrigan et al. | 260—75 |

DONALD E. CZAJA, Primary Examiner

M. J. WELSH, Assistant Examiner

U.S. Cl X.R.

117—123 D, 124 E, 132 B, 148; 260—30.6 R, 31.8 N, 33.6 UB, 33.8 UB, 37N, 45.95, 47 CB, 75 NE, 77.5 AA, 859 R